UNITED STATES PATENT OFFICE.

CHARLES KURTH AND ALEXANDER MASTERS, OF NEW YORK, N. Y., ASSIGNORS TO WILLIAM DEMUTH, OF SAME PLACE.

TOBACCO-PIPE.

SPECIFICATION forming part of Letters Patent No. 638,130, dated November 28, 1899.

Application filed May 16, 1899. Serial No. 717,087. (No specimens.)

*To all whom it may concern:*

Be it known that we, CHARLES KURTH, residing at New York, (Brooklyn,) in the county of Kings, and ALEXANDER MASTERS, residing at New York, (Metropolitan,) in the county of Queens, State of New York, citizens of the United States, have invented new and useful Improvements in Tobacco-Pipes, of which the following is a specification.

The object of this invention is to produce a tobacco-pipe of light weight and increased porosity as compared with the present clay pipes; and to this end the invention relates to a composition of matter to be used for the manufacture of pipes or the bowls of pipes.

The composition consists of clay and flour. By "flour" is meant the meal of wheat or other grain—such, for example, as rye or other cereals. These ingredients are combined in about the following proportions: Clay, seventy-five pounds; flour, twenty-five pounds. These ingredients in the shape of a fine powder are mixed and sufficient water added to make the composition plastic, so that the same can be molded or formed in the manner customary in manufacturing clay pipes. In carrying out the invention ten gallons of water to one hundred pounds of the mixture have been found to give satisfactory results. After the composition has been molded or formed into a bowl or pipe it is baked in the manner customary in the manufacture of clay pipes.

The above composition will give a light pipe easily made up or formed and the clay in which will not rot. Such pipe can also be cheaply made.

Pipes made according to this invention have been found to possess an increased degree of porosity as compared with ordinary clay pipes, and the pipes made from such composition will absorb nicotine and the like, so that these pipes remain pleasant to the taste and agreeable and cleanly when being handled or used, and also when out of use or carried in the pocket or about the person. These pipes, on account of their absorbent character, are always clean and dry even directly after use or during use.

What we claim as new, and desire to secure by Letters Patent, is—

The herein-described composition of matter, for the manufacture of tobacco-pipes, consisting of clay, flour and water, in about the proportion specified.

In testimony whereof we have hereunto set our hands in the presence of two subscribing witnesses.

CHARLES KURTH.
ALEXANDER MASTERS.

Witnesses:
LOUIS DENNETT,
JAMES PETTIGREW.